United States Patent [19]
Ficht et al.

[11] Patent Number: 5,175,749
[45] Date of Patent: Dec. 29, 1992

[54] APPARATUS AND METHOD FOR DC OFFSET CORRECTION IN A RECEIVER

[75] Inventors: David A. Ficht, Hoffman Estates; Gary D. Schulz, Cary, both of Ill.

[73] Assignee: Motorola, Inc., Schaumburg, Ill.

[21] Appl. No.: 646,539

[22] Filed: Jan. 25, 1991

[51] Int. Cl.⁵ .......................................... H04L 25/06
[52] U.S. Cl. ..................................... 375/76; 375/94; 328/116; 330/137; 330/259; 330/270; 330/290
[58] Field of Search .................. 375/76, 94, 102; 307/358, 359; 328/116, 165; 358/171; 330/137, 259, 270, 290

[56] References Cited

U.S. PATENT DOCUMENTS 3,509,279  4/1970  Martin et al. .................... 375/76
4,186,384  1/1980  Acker ............................. 375/76
4,263,555  4/1981  Hunka ............................ 328/116
4,873,702 10/1989  Chin ............................. 375/76

Primary Examiner—Curtis Kuntz
Assistant Examiner—Young Tse
Attorney, Agent, or Firm—Richard A. Sonnentag; Raymond J. Warren

[57] ABSTRACT

An apparatus automatically corrects for DC offset in a multi-level packet-switched receiver. A reference carrier frequency is used during the receiver's idle mode to establish a DC offset exiting a discriminator (302). The DC offset is amplified by a video amplifier (315) and fed into an error amplifier (320) which generates the negative of the DC offset. The DC offset and the negative of the DC offset are input into a summing network (330) resulting in a zero DC offset exiting the video amplifier (315).

28 Claims, 3 Drawing Sheets

APPARATUS AND METHOD FOR DC OFFSET CORRECTION IN A RECEIVER

FIELD OF THE INVENTION

This invention generally relates to receivers detecting multi-level data and more specifically to receivers correcting for DC offsets after detection of multi-level data.

BACKGROUND OF THE INVENTION

In multi-level data packet-switched systems, demodulators are often used to accomplish data detection. The filters used to band-limit the modulated IF spectrum are typically not symmetric about the IF center frequency. Since the output of demodulators are AC coupled, the coupling capacitor used will charge to the noise idle or average value of the noise being provided by the filter. This average noise voltage may be offset somewhat from the demodulator voltage produced by a on-channel signal, so that when the receiver goes from a no signal condition to receiving a packet, there is a long RC time constant due to the fact that a large capacitor must be used to pass the low frequency components of the data signal. This time constant is sufficiently long so as to appear as a DC offset when observing in the time frame of a single packet.

The problem caused by the DC offsets is that, in typical multi-level data detection schemes, an absolute DC level is used to establish differing "zones" for detection. If the average noise voltage (DC offset) is high, demodulation errors will occur. The DC offsets that are present at the output of the demodulator can be manually adjusted to compensate for the offset, but eventually the preset manual adjustments will drift over time due to changing temperature and the corresponding change in the component characteristics. Other implementations have used a feed-forward system in trying to send a carrier before the detector or demodulator begins to detect information. This method however, consumes a fair amount of space in the packet, reducing the amount of available data throughput.

Thus, a need exists for a DC offset correction system that continuously corrects for DC offset while not requiring the use of a broadcasted carrier.

SUMMARY OF THE INVENTION

An apparatus corrects for DC offset of a pulse modulated signal in a receiver. The apparatus demodulates the pulse modulated signal and determines an error voltage relative to a pre-determined reference voltage and corresponding to the DC offset before the demodulator demodulates the pulse modulated signal. The apparatus, responsive to the determination, generates a correction voltage having a magnitude equal to the error voltage and having polarity opposite the error voltage and sums the error voltage and the correction voltage.

BRIEF DESCRIPTION OF THE DRAWINGS

FIG. 2A depicts generally demodulation of a multi-level symbol having no DC offset due to SAW filter asymmetry while

DETAILED DESCRIPTION OF THE PREFERRED EMBODIMENT

Figure 1:
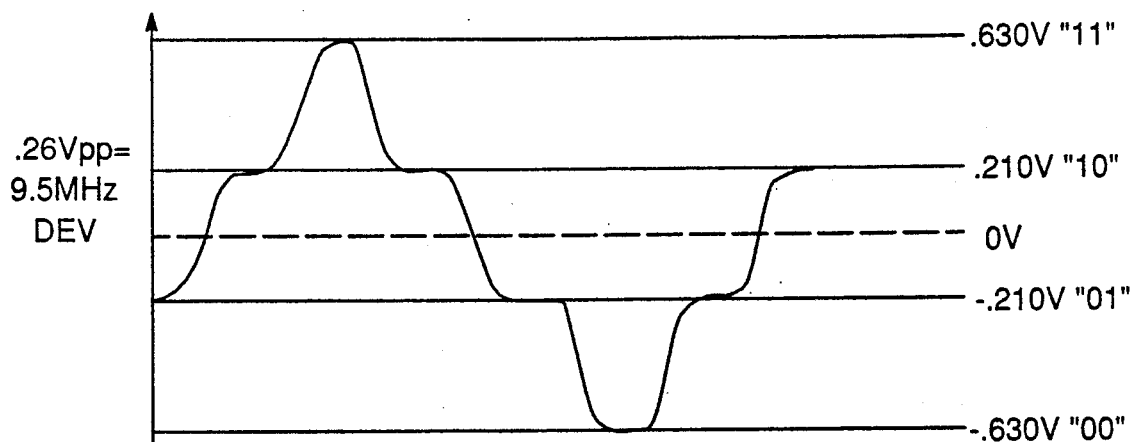
FIG. 1 generally depicts a waveform diagram of the bit values and voltage levels of a multi-level data symbol signal.

In systems employing very high speed data rates, multi-level data symbols are difficult to correctly recover and detect due to the fact that the detector must detect the polarity of the symbol and also the level of the symbol with respect to a predetermined reference voltage. FIG. 1 generally depicts a symbol signal corresponding to different levels in a multi-level system. The multi-level signal of FIG. 1 illustrates five levels representing a predetermined reference voltage at zero volts and four separate levels given by the binary representation below:

"00" at most negative level (nominally −0.63 V)
"01" at least negative level (nominally −0.21 V)
"10" at least positive level (nominally +0.21 V)
"11" at most positive level (nominally +0.63 V)

The binary values assigned to the particular levels are for illustration purposes only.

The binary representation is a result of inputting the multi-level symbol into a analog-to-digital (A/D) converter which, using zero volts as a midpoint or center reference, detects the corresponding voltage of the symbol and converts that voltage to the desired binary representation. For accurate conversion, the A/D converter must "see" the incoming multi-level data symbol centered around zero to make an accurate conversion. If the multi-level data is offset, the A/D converter is not able to realize the offset and may thus erroneously convert a desired voltage into the incorrect binary representation.

Figure 2A:
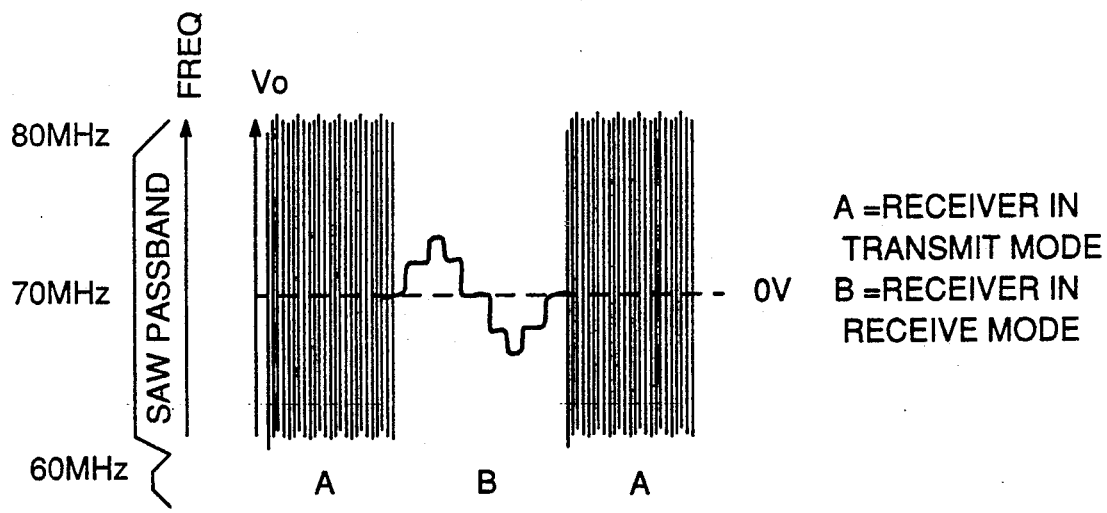
Figure 2B:
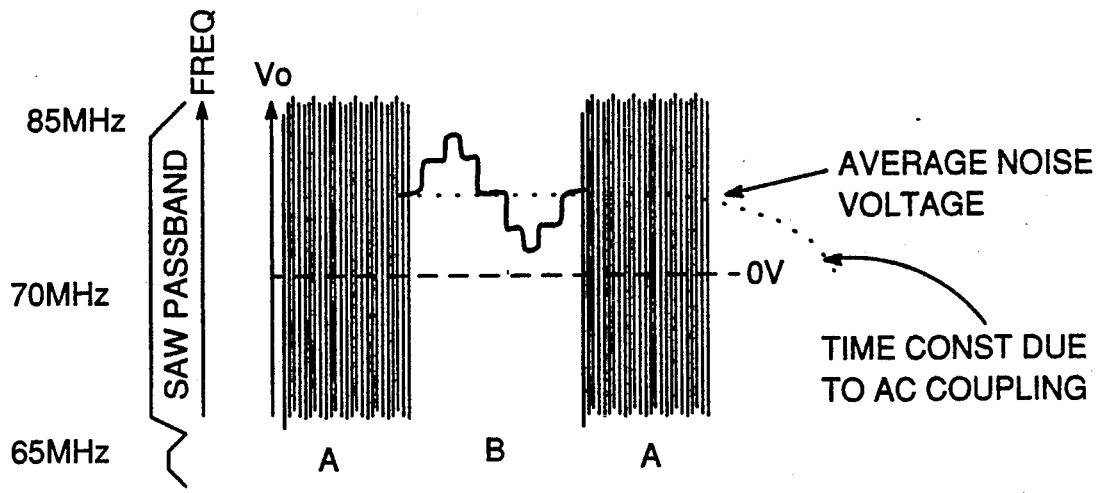
FIG. 2B depicts generally demodulation of a multi-level symbol having a DC offset due to SAW filter asymmetry.

FIGS. 2A and 2B depict typical transmissions in a packet-switched multi-level data system. FIG. 2A depicts the ideal video output (discriminator output amplified by a video amplifier) vs. time case where the surface acoustic wave (SAW) passband filter is symmetrically centered about the carrier frequency, which in the preferred embodiment is 70 MHz. In mode A, the receiver is in the transmit mode where it is off frequency and not expecting to detect anything. Thus, as is shown in FIG. 2A, the receiver only picks up noise. In a predetermined time period or mode B however, the receiver is in the receive mode, thus it is on channel and able to detect the multi-level data symbol. When the receive mode has been completed, the receiver returns to the transmit mode A where again its just receiving noise. FIG. 2B depicts the same scenario but here the SAW passband filter is not symmetric about the carrier frequency 70 MHz. Since the output of the discriminator is AC coupled, the coupling capacitor will charge to a noise idle offset or average value of the noise being provided by the SAW filter. This average noise voltage may be offset somewhat from the discriminator voltage produced by an on-channel signal. Since the time length of the packet is much less than the RC time constant due the AC coupling, the effect is a DC offset that the detected signal seems to "ride on" during the demodulation process. As stated earlier, this DC offset, if presented to an A/D converter at this point, would result in erroneous conversion of the desired level to its corresponding binary representation.

Figure 3:
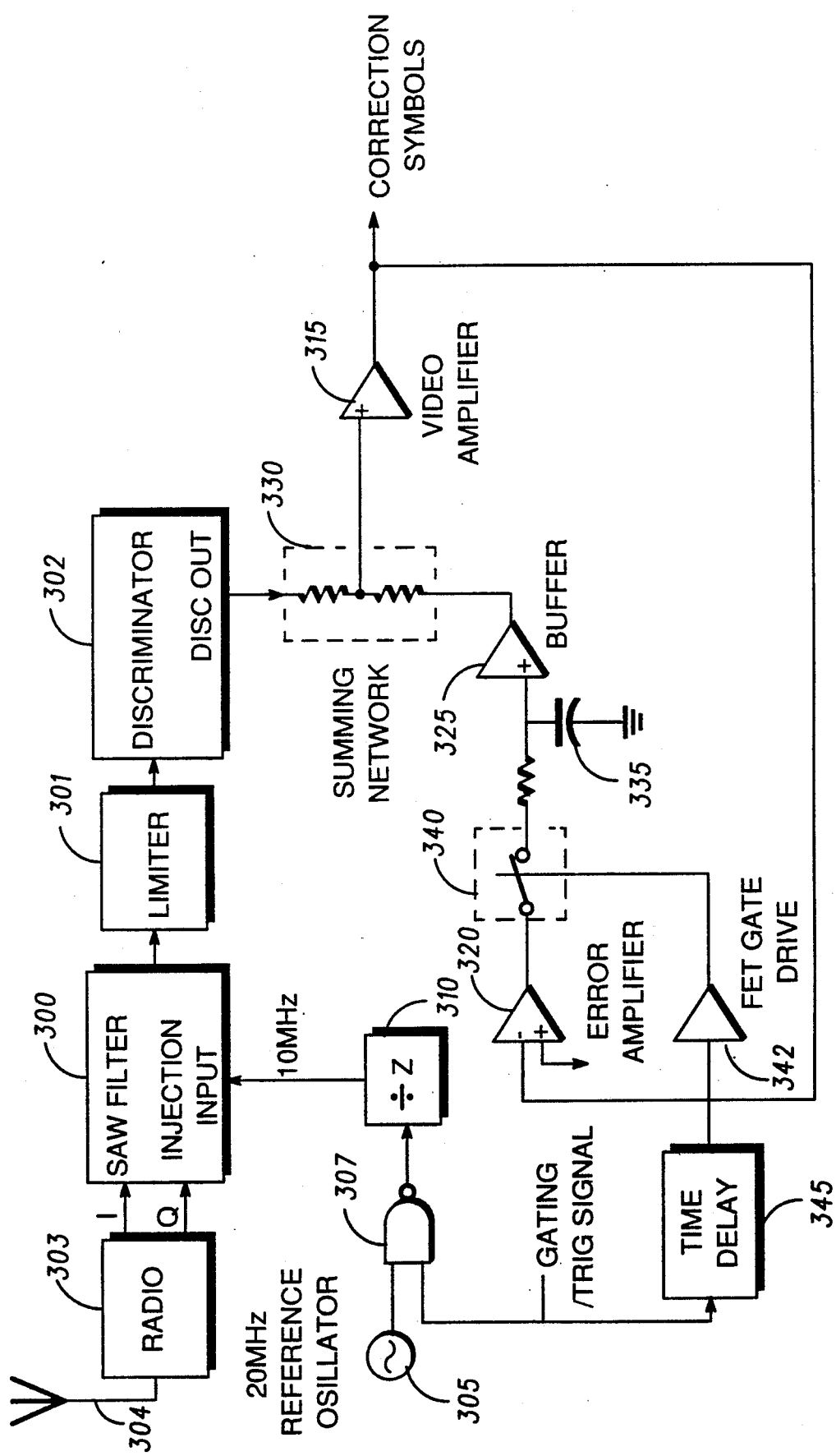
FIG. 3 generally illustrates an analog implementation of hardware that performs automatic DC offset correction in accordance with the invention.

FIG. 3 depicts hardware that corrects for the above stated DC offset or offset due to other factors in accordance with the invention. The hardware eliminates the need for AC coupling a discriminator 302 to a video amplifier 315 in a high speed packetized system, thus eliminating the noise idle offset due to IF filter asymmetry. Operation of the hardware is as follows. A modulated RF carrier is input into the SAW filter 300 which provides the filtering of undesired signals. Also, input into the SAW filter 300 is a 10 MHz reference signal which is generated by inputting a signal from a 20 MHz reference oscillator 305 into a divide by 2 network 310. The 20 MHz oscillator 305 is used since the spurious outputs from the oscillator 305 do not appear in the 70 MHz passband of the SAW filter 300. Continuing, the SAW filter 300 is designed to select the seventh harmonic of the 10 MHz signal resulting in the desired carrier frequency of 70 MHz. This known carrier frequency of 70 MHz is used and applied to the SAW filter 300 during mode A as depicted in FIG. 2A. The 70 MHz carrier signal generates an error voltage or a DC offset voltage due to the operating point of the discriminator 302 and eventually appears at the output of the discriminator 302. While still in mode A, the DC offset is amplified by a video amplifier 315 and the output of the amplifier is input into an error amplifier 320. The error amplifier 320 is a differential amplifier whose positive terminal is referenced to ground, thus creating an output correction voltage having a relatively equal but opposite voltage of the output of the video amplifier 315. The output from the error amplifier 320 is fed into a buffer 325 whose output is input into a resistive summing network 330. The resistive summing network sums the discriminator output DC offset with the equal and opposite output from the buffer 325, thus yielding an input to the video amp 315 that has zero DC offset.

At the input of the buffer 325, a capacitor 335 is shunted to ground, and essentially maintains the correction voltage. Output from the error amplifier 320 is input into a FET switch 340 which is controlled by a trigger occurring when the receiver changes from mode A to mode B. The trigger is also input into a NAND gate 307 which has as another input the 20 MHz reference 305. When the trigger occurs, the 10 MHz signal output from the divide by 2 circuitry 310 is gated off to eliminate corruption of the SAW filter 300, limiter 301, discriminator 302 chain due to injected spurs. Also in response to the trigger, the FET switch 340 is opened and the correction voltage that is maintained on the shunt capacitor 335 is continuously applied to the summing network 330 so that the capacitor 335 does not charge to the average value of the video amplifier 315. At the end of mode B, a trigger is again sent which closes the FET switch 340 resulting in closing the feedback loop and recharging the shunt capacitor 335 to the appropriate correction voltage. The trigger signal which triggers the FET switch 340 to close is time delayed by time delay circuitry 345 to correspond to the delay of the SAW filter 300, limiter 301, and discriminator 302 chain.

Figure 4:
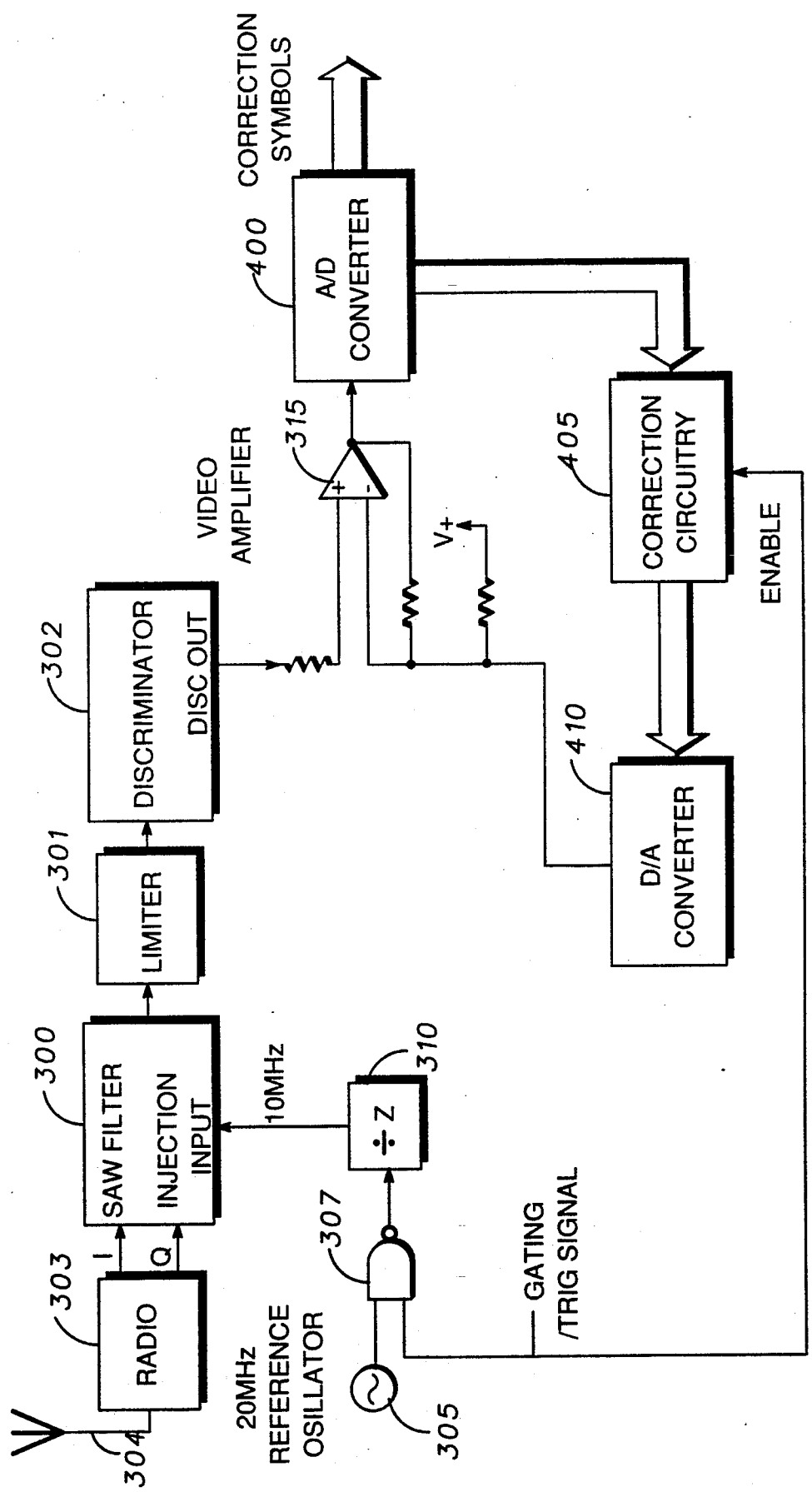
FIG. 4 generally illustrates a digital implementation of hardware that performs automatic DC offset correction in accordance with the invention.

Alternatively, the feedback loop which performs the correction for the DC offset exiting the discriminator 302 can be performed digitally as shown in FIG. 4. As is the case in FIG. 3, a 20 MHz reference oscillator 305 is used to generate the 10 MHz injection signal input into the SAW filter 300 yielding the DC offset exiting the discriminator 300 and subsequently the video amplifier 315. Initially, when the receiver is in mode A, the DC offset is amplified by the video amplifier 315 and input into an A/D converter 400. Output from the A/D converter 400 is a digital error word or a 8-bit digital work which represents a specific DC offset or discriminator operating point. The 8-bit word is input into correction circuitry 405 which looks at the word and compares it to a digital reference word or the 8-bit digital word it would expect to see if the DC offset were zero. The correction circuitry then generates a digital correction word according to the amount of compensation or correction that is required and sends the 8-bit digital word to a D/A converter 410. The D/A converter 410 converts the 8-bit digital word exiting correction circuitry 405 into the corresponding correction current which is injected into the opposite port of the video amplifier 315. The feedback process continuously tries to maintain the video amplifier 315 output at zero DC offset by altering the 8-bit word entering the D/A converter 410. When the DC offset is zero, the output from the A/D converter 400 is the expected 8-bit word for zero DC offset, thus the correction circuitry 405 will not alter the 8-bit word exiting the correction circuitry 405. In this case, the D/A converter 410 receives the same 8-bit digital word it previously received, and consequently the correction voltage remains the same. When the receiver transitions from the transmit mode to the receive mode, mode A to mode B in FIG. 2A, a trigger disables correction circuitry 405 and the D/A converter 410 maintains its present input. During mode B, when the receiver is in the receive mode, the D/A converter 410 maintains the last 8-bit word it received subsequently maintaining the last correction current applied to the video amplifier 315. As in the analog implementation of FIG. 3, when the receiver changes modes from the receive mode to the transmit mode, mode B to mode A in FIG. 2A, the trigger enables correction circuitry 405 and the feedback process continues.

Using the DC correction hardware of FIG. 3 and FIG. 4, the need for adjustment of the input offset voltage of the video amplifier 315 is eliminated. Tight control of DC offset components is crucial in multi-level data demodulation since symbol level resolution must be more accurate than in binary systems. The elimination of this adjustment reduces the amount of calibration required during the manufacturing process and makes the demodulator and video amplifier immune to long term drift with time and temperature. In addition, by using a feedback network and an error amplifier 320, these circuits will not introduce additional DC offset errors of its own. All offset errors in the video amplifier and correction circuit as well as "noise idle" offsets encountered when the receiver is in mode A or the transmit mode, are corrected by the feedback network and error amplifier 320.

What we claim is:

1. An apparatus which corrects for a DC offset of a demodulated signal in a receiver, the apparatus comprising:
   means for demodulating a pulse modulated signal forming the demodulated signal having the DC offset;
   means, coupled to said means for demodulating, for determining an error voltage relative to a predetermined reference voltage and corresponding to the DC offset;

means, coupled to said means for determining, for summing said error voltage and a correction voltage, forming a summed voltage; and means, coupled to said means for summing, for receiving the summed voltage and for generating said correction voltage.

2. The apparatus of claim 1 wherein said means for generating said correction voltage further comprises means for inverting said error voltage to yield said correction voltage.

3. The apparatus of claim 1 wherein said means for generating said correction voltage further comprises means for converting said error voltage into a digital error word.

4. The apparatus of claim 3 wherein said means for generating said correction voltage further comprises means for generating a digital correction word in response to a comparison of said digital error word and a pre-determined digital reference word.

5. The apparatus of claim 4 wherein said pre-determined digital reference word is related to said pre-determined reference voltage.

6. The apparatus of claim 4 wherein said means for generating said correction voltage further comprises means for converting said digital correction word to said correction voltage.

7. An apparatus which corrects for DC offset of a pulse modulated signal in a receiver, the receiver demodulating said pulse modulated signal during a pre-determined time period, the apparatus comprising:

means for determining, before the pre-determined time period, an error voltage of a reference signal having frequency characteristics related to the frequency of the pulse modulated signal;

means, coupled to said means for determining, for generating a correction voltage having a magnitude equal to said error voltage and having polarity opposite said error voltage;

means, coupled to said means for generating, for maintaining said correction voltage;

means for removing said correction voltage from said means for maintaining responsive to the start of said pre-determined time period; and means for summing said error voltage and said maintained correction voltage.

8. The apparatus of claim 7 wherein said means for maintaining further comprises a capacitor.

9. The apparatus of claim 7 wherein said means for removing further comprises means for applying said correction voltage to said means for maintaining responsive to the end of said pre-determined time period.

10. An apparatus which corrects for DC offset of a pulse modulated signal in a receiver, the receiver demodulating said pulse modulated signal during a pre-determined time period, the apparatus comprising:

means for determining, before the pre-determined time period, an error voltage of a reference signal having frequency characteristics related to the frequency of the pulse modulated signal;

first means for converting said error voltage into a digital error word;

means for generating a digital correction word in response to a comparison of said digital error word and a pre-determined digital reference word;

second means for converting said digital correction word to a correction voltage;

means for maintaining said correction voltage;

means for disabling said means for generating responsive to the start of said pre-determined time period; and means for summing said error voltage and said maintained correction voltage.

11. The apparatus of claim 10 wherein said first means for converting further comprises an analog-to-digital (A/D) converter.

12. The apparatus of claim 10 wherein said second means for converting further comprises an digital-to-analog (D/A) converter.

13. The apparatus of claim 10 wherein said means for maintaining said correction voltage further comprises means for maintaining said digital correction word.

14. The apparatus of claim 10 wherein said means for disabling further comprises means for enabling said means for generating responsive to the end of said pre-determined time period.

15. A receiver employing an apparatus which corrects for a DC offset, the receiver demodulating a pulse modulated signal during a pre-determined time period, the receiver comprising:

means for receiving the pulse modulated signal during the pre-determined time period;

means, coupled to said means for receiving, for determining an error voltage of a reference signal having a frequency characteristic related to the frequency of the pulse modulated signal;

means, coupled to said means for determining, for generating a correction voltage having a magnitude equal to said error voltage and having a polarity opposite said error voltage;

means, coupled to said means for generating, for maintaining said correction voltage;

means for removing said correction voltage from said means for maintaining responsive to a start of said pre-determined time period; and means for summing said error voltage and said maintained correction voltage.

16. The receiver of claim 15 wherein said means for removing further comprises means for applying said correction voltage to said means for maintaining responsive to the end of said pre-determined time period.

17. A receiver employing an apparatus which corrects for a DC offset, the receiver demodulating a pulse modulated signal during a pre-determined time period, the receiver comprising:

means for receiving the pulse modulated signal during the pre-determined time period;

means, coupled to said means for receiving, for determining an error voltage of a reference signal having a frequency characteristic related to a frequency of the pulse modulated signal;

first means for converting said error voltage into a digital error word;

means for generating a digital correction word in response to a comparison of said digital error word and a pre-determined digital reference word.

second means for converting said digital correction word to a correction voltage;

means for maintaining said correction voltage;

means for disabling said means for generating responsive to a start of said pre-determined time period; and means for summing said error voltage and said maintained correction voltage.

18. The receiver of claim 17 wherein said means for disabling further comprises means for enabling said means for generating responsive to the end of said predetermined time period.

19. A method of correcting for a DC offset of a pulse modulated signal in a receiver, the method comprising the steps of:
   determining an error voltage relative to a pre-determined reference voltage and corresponding to the DC offset;
   demodulating the pulse modulated signal;
   generating, following said step of determining, a correction voltage having a magnitude equal to said error voltage and having a polarity opposite said error voltage; and
   summing said demodulated pulse modulated signal and said correction voltage.

20. The method of claim 19 wherein said step of generating further comprises the step of inverting said error voltage to yield said correction voltage.

21. The method of claim 19 wherein said step of generating a correction voltage further comprises the step of converting said error voltage into a digital error word.

22. The method of claim 21 wherein said step of generating a correction voltage further comprises the step of generating a digital correction word in response to a comparison of said digital error word and a pre-determined digital reference word, and said pre-determined digital reference word is related to said pre-determined reference voltage.

23. The method of claim 22 wherein said step of generating a correction voltage further comprises the step of converting said digital correction word to said correction voltage.

24. A method of correcting for DC offset of a pulse modulated signal in a receiver, the receiver demodulating said pulse modulated signal during a pre-determined time period, the method comprising the steps of:
   determining, before the pre-determined time period, an error voltage of a reference signal having frequency characteristics related to the frequency of the pulse modulated signal;
   generating a correction voltage having a magnitude equal to said error voltage and having polarity opposite said error voltage;
   maintaing said correction voltage;
   removing said correction voltage from said step of maintaining responsive to the start of said pre-determined time period; and
   summing said error voltage and said maintained correction voltage.

25. The method of claim 24 wherein said step of removing further comprises the step of applying said correction voltage to said step of maintaining responsive to the end of said pre-determined time period.

26. A method of correcting for DC offset of a pulse modulated signal in a receiver, the receiver demodulating said pulse modulated signal during a pre-determined time period, the method comprising the steps of:
   determining, before the pre-determined time period, an error voltage of a reference signal having frequency characteristics related to the frequency of the pulse modulated signal;
   first step of converting said error voltage into a digital error word;
   generating a digital correction word in response to a comparison of said digital error word and a pre-determined digital reference word
   second step of converting said digital correction word to a correction voltage;
   maintaining said correction voltage;
   disabling said step of generating responsive to the start of said pre-determined time period; and
   summing said error voltage and said maintained correction voltage.

27. The apparatus of claim 26 wherein said step of maintaining said correction voltage further comprises the step of maintaining said digital correction word.

28. The apparatus of claim 27 wherein said step of disabling further comprises the step of enabling said step of generating responsive to the end of said pre-determined time period.

* * * * *